United States Patent [19]

Kuwabara

[11] 3,974,433
[45] Aug. 10, 1976

[54] AUTOMATIC CONTROL APPARATUS WITH SATURATION ELEMENT

[75] Inventor: Takao Kuwabara, Hitachi, Japan

[73] Assignee: Hitachi, Ltd., Japan

[22] Filed: Oct. 15, 1974

[21] Appl. No.: 514,993

[30] Foreign Application Priority Data
Oct. 17, 1973   Japan.............................. 48-115931

[52] U.S. Cl. .............................................. 318/635
[51] Int. Cl.² .......................................... G05B 5/01
[58] Field of Search ............ 318/610, 621, 624, 635

[56] References Cited
UNITED STATES PATENTS

| | | | |
|---|---|---|---|
| 2,901,680 | 8/1959 | Goldman ......................... | 318/635 X |
| 3,046,465 | 7/1962 | Litynski et al. ................... | 318/635 X |
| 3,201,675 | 8/1965 | Curran et al. ..................... | 318/635 X |
| 3,419,771 | 12/1968 | Bentley et al. .................... | 318/635 X |
| 3,424,402 | 1/1969 | Bulloch et al. .................... | 318/635 X |
| 3,510,737 | 5/1970 | Brown et al. ..................... | 318/635 X |
| 3,701,992 | 10/1972 | Allen ............................... | 318/635 X |
| 3,758,838 | 9/1973 | Wright............................. | 318/635 X |

Primary Examiner—Robert K. Schaefer
Assistant Examiner—W. E. Duncanson, Jr.
Attorney, Agent, or Firm—Craig & Antonelli

[57] ABSTRACT

An automatic control apparatus comprises a means for detecting deviation of an actual value from a target value of a controlled quantity for the control operations and a damping feedback means, at least one of which means is provided with an element having a saturation characteristic. Predetermined relations are established between the input value to saturate the output of the detector means and the input value to saturate the output of the damping feedback means to thereby enhance mainly the response of operation for the control in one direction, while for the control operation in the other direction, stability is improved.

6 Claims, 7 Drawing Figures

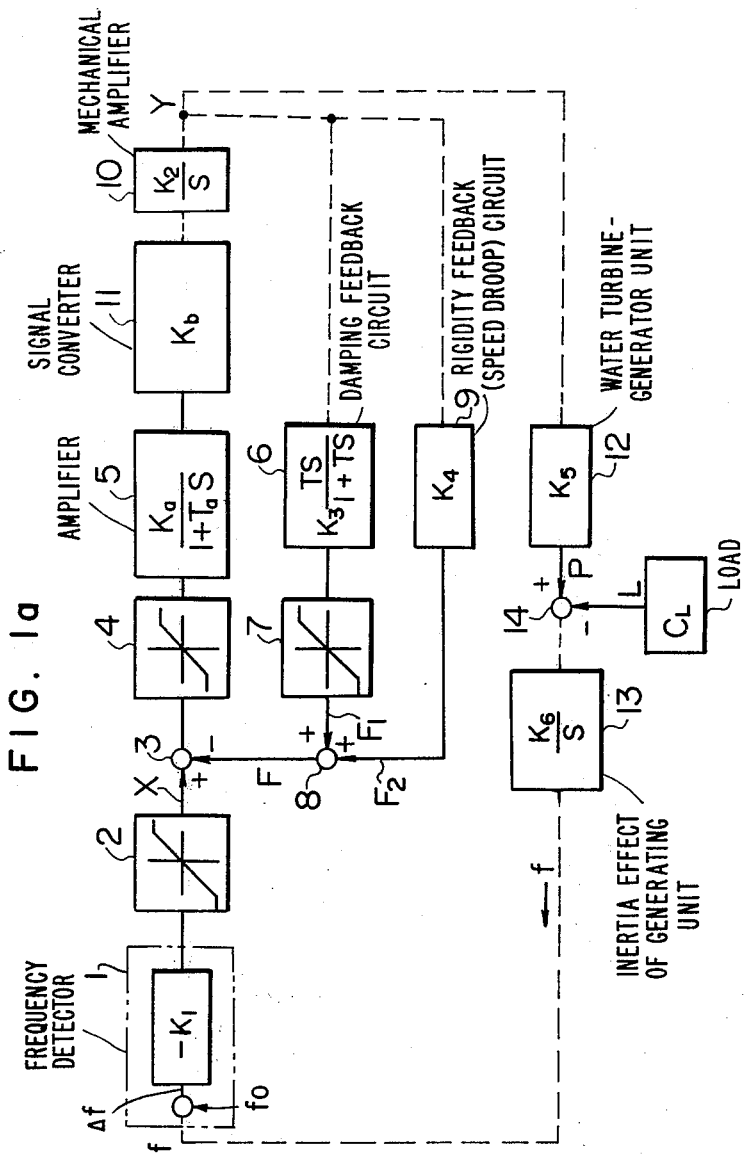

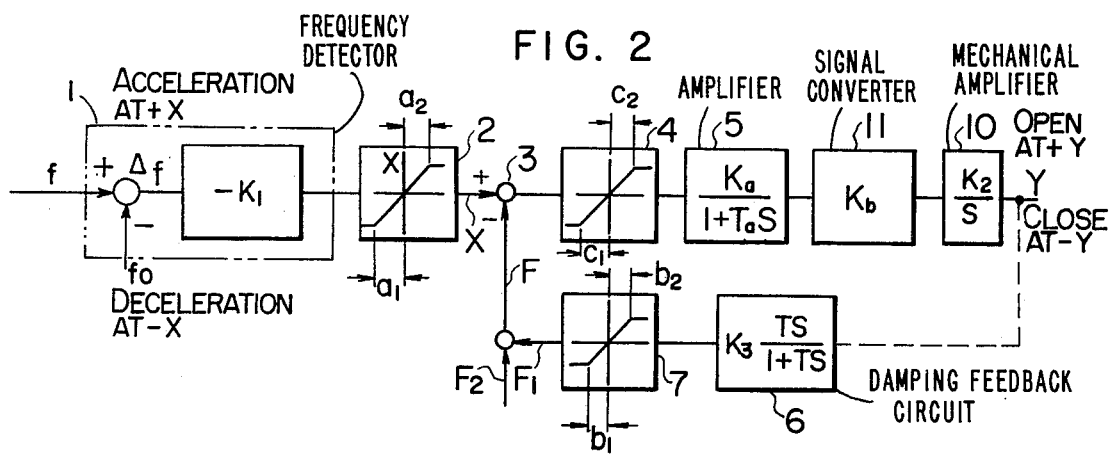
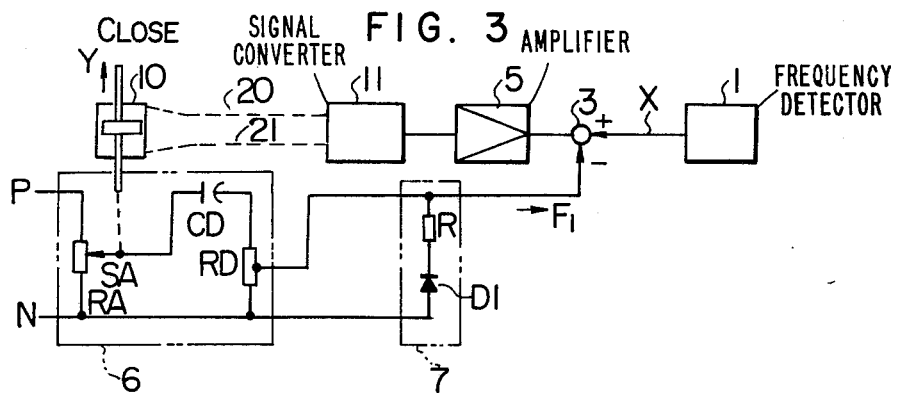
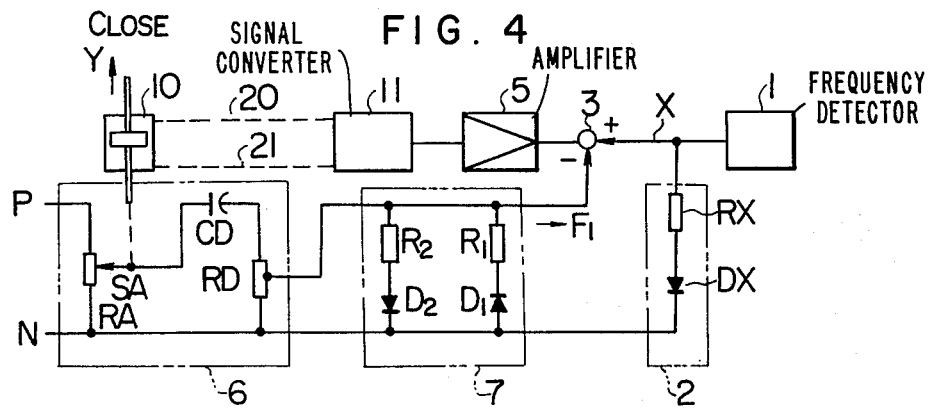

AUTOMATIC CONTROL APPARATUS WITH SATURATION ELEMENT

BACKGROUND OF THE INVENTION

1. Field of the Invention

The present invention relates to an automatic control apparatus, especially having saturation characteristics.

2. Description of the Prior Art

In general, it is known that the stability and the rapidity of response in the operation of automatic control apparatus are incompatible requirements which are difficult to fulfill simultaneously and are in such a contradictory relationship that, if the stability is improved, the response characteristic will deteriorate and vice versa.

It has been proposed in the past to change over the gains and/or time constants of an elastic or damping feedback element of the control apparatus in compliance with the quantity of operation of a controlled device such as the position of a servomotor or the like, for example. This method is disadvantageous in that the stability in the control operation is degraded in dependence upon the controlled quantity such as the positioning. According to another known method, saturation is imposed on the output of the damping feedback element both for the opening and the closing operations. This method certainly assures stability for such small or slow variations in the controlled quantity at which the damping feedback circuit may not be saturated. However, for a relatively large variation, satisfactory stability cannot be attained, because the damping feedback circuit is saturated for both the opening and the closing operations of the controlled device.

SUMMARY OF THE INVENTION

According to the present invention, an automatic control apparatus exhibits a fast response in one of the opening and the closing operations of the controlled device or instrument and has a high stability in the other operation. According to the invention, it is contemplated to provide an automatic control apparatus which allows the contradictory requirements of stability and a fast or rapid response to be reasonably compatable with each other in the control operation by making them comply with the prevailing demand and the characteristics of the controlled apparatus.

When a rapid response is required for one of the operations of the controlled device either in the opening or the closing direction, the control apparatus according to the invention can furnish the desired fast response to the operation in the required direction without losing stability of the control system. In other words, in order to deal with such a state where the stability is degraded if the response is to be enhanced and vice versa, the invention makes these contradictory requirements compatible with each other by appropriately relating them to the dominant characteristics of the controlled apparatus. For example, considering a governor having a servomotor for controlling the water supply to a hydraulic turbine generator in dependence upon changes in the load, the rapid response in the control operation of the governor or servometer is especially required only in one direction, namely to close the valve.

According to the present invention, there is provided an automatic control apparatus which comprises a detector means for detecting the deviation of an actual value from a target value of a controlled quantity, an amplifier means for receiving the output signal from the detector means to amplify it with integration to produce an output signal, feedback means for feeding back the output signal from the amplifier means through a damping feedback element and a rigid feedback element, a summing means for deriving the difference between the output signal of the detector means and the feedback means to thereby feed the difference signal to the amplifier means, a control means to regulate a device to be controlled in dependence upon the output signal of the amplifier means, and means for saturating the output signal of the damping feedback means only for the operation of the controlled device either in the opening or closing direction.

It is to be noted that, in the present invention, the inherent stability can be assured, even in the control direction for which the fast response is required, when the output of the detector means, (the input to the automatic control system comprising the integrating amplifier and the feedback means,) is of a small amplitude or varied slowly, since in such a case there is no necessity to rapidly operate the controlled device. In more detail, as long as the output of the damping feedback element is not saturated, that is, the damping feedback function is maintained sufficiently effective, the difference between the output of the detector and the damping feedback element will become small, which means that the controlled device is slowly operated. In such a situation, if the input signal to the control system from the detector is of a small magnitude or varied slowly, the output from the damping feedback element also remains at a small value and will not attain the saturated value even in the direction to which the saturation is imposed. Thus, inherent stability can be obtained.

On the other hand, when the output signal of the detector or the input to the control system is of a great magnitude or varied abruptly, the output of the damping feedback element tends to correspondingly increase to maintain the stability. However, due to the saturation effect, the output from the feedback element can not exceed a predetermined value. Since the following or slaving tendency of the output of the feedback element to the output of the detector is then broken, the difference between these outputs is increased rapidly, whereby the controlled device is operated at a high speed. Under these conditions, the stabilizing function of the damping feedback element is not effective and the controlled device will overshoot in the operated direction, which will be then reflected to the detector as the input thereto having, however, the reversed direction or polarity. It should be recalled that the damping feedback element can never be saturated in this reversed direction. The stabilizing function of the damping feedback element is restored. In case the saturation is imposed on the damping feedback element in both the opening and closing directions, there is a possibility that the controlled device may overshoot in response to the reflected input to the detector and thereby the hunting effect may be continued without being attenuated. Even in such a case, if the detector means is so constructed that it also may be saturated at an input value smaller than the ones at which the damping feedback element is saturated, the output of the latter can follow that of the detector within a restricted range determined by the saturation of the detector, and effect the stabilizing function. In order to assure a desired fast response in the direction required by the controlled device, no saturation is imposed on the output of the detector in that direction or, alternatively, the detector may be saturated in that direction, however, at a value greater than that of the damping feedback element in the corresponding direction. In connection with terminology, it should be understood that the terms "saturation element", "element with saturation" or "saturation circuit" as herein used mean electrical or mechanical elements or circuits which produce outputs saturated at values determined by inputs thereto.

BRIEF DESCRIPTION OF THE DRAWINGS

FIG. 1a is a block diagram showing an exemplary embodiment of the automatic control apparatus according to the invention applied to an electric governor for a hydraulic turbine generator.

FIG. 1b is a circuit diagram of the embodiment of the inventive apparatus shown in FIG. 1a.

FIG. 2 is a block diagram showing a main portion of the governor shown in FIG. 1a to illustrate a principle of the operation thereof.

FIG. 3 is a circuit diagram showing an exemplary embodiment of a damping feedback circuit.

FIG. 4 is a circuit diagram showing another embodiment of the damping feedback circuit.

DESCRIPTION OF THE PREFERRED EMBODIMENTS

Figure 1B:
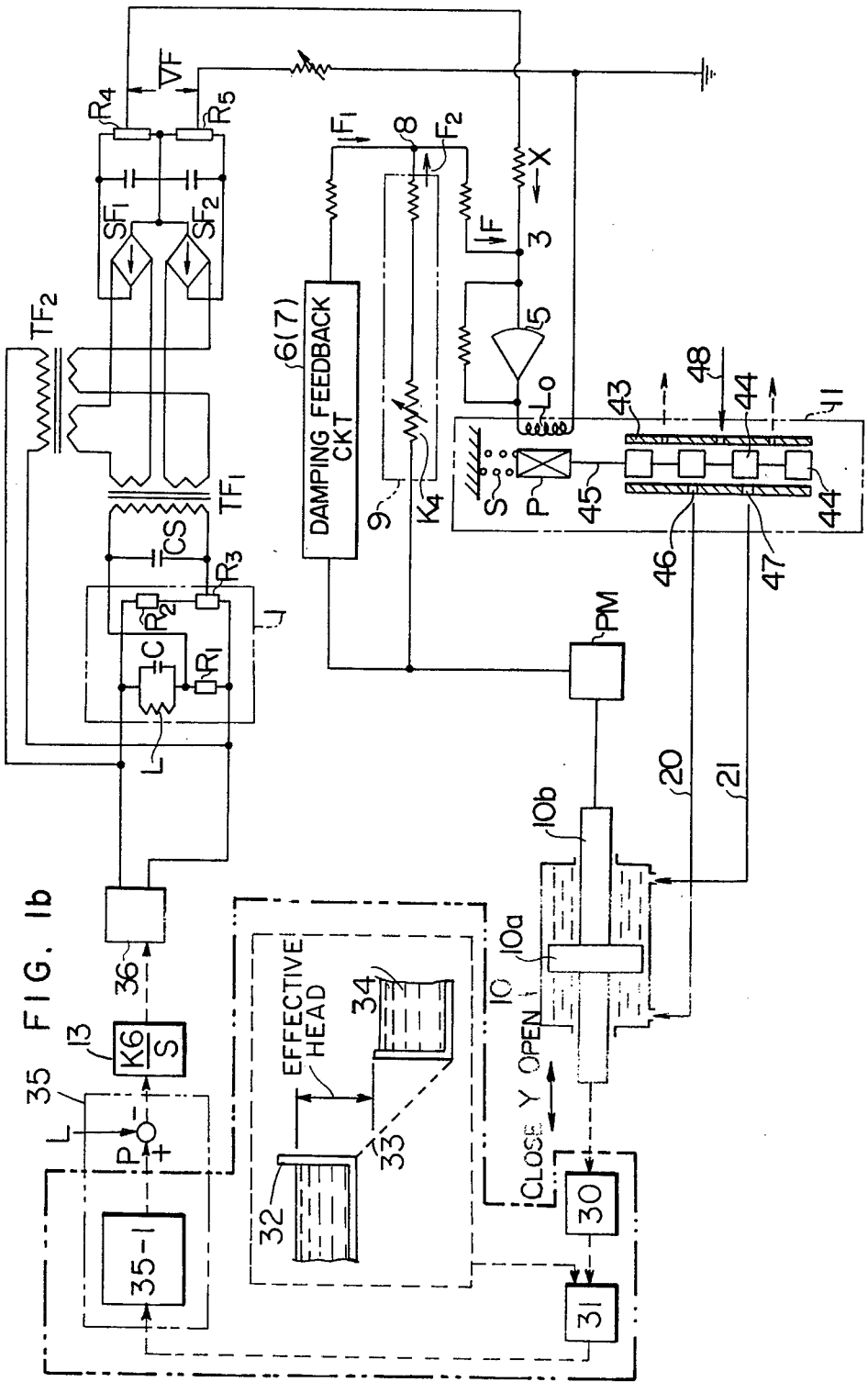

In the following exemplary embodiments of the invention, the automatic control apparatus will be described with reference to the case of an electric governor for use with a hydraulic turbine generator, sometimes referred to as a water wheel generator.

Since the water supply conduit or the hydraulic pipe to the water wheel or turbine is in general of a relatively small cross section and elongated, the stability of the water turbine control system is often subjected to seriously adverse influences due to the behavior of the water under inertia within the pipe line. Accordingly, it is necessary to provide an elastic or damping feedback circuit in order to inhibit such instability or hunting phenomenon of the operation. However, because of the inherent tendency of the damping feedback circuit to suppress the normal operation of the governor, there arises another problem, that is, when a steep reduction in the load occurs at the time of load rejection and the output regulating apparatus for the water turbine has to control the guide vanes or deflectors of the water wheel so as to be rapidly compatible with the reduced load, the governor tends to obstruct a rapid responsive operation of the output regulator apparatus. It is most important to note that the present invention is capable of eliminating the above contradiction and can provide the most ideal governor which allows, even under the mutually contradictory conditions, system stability and a rapid response to be compatible with each other.

Now, electric governor for the water wheel generator to which the present invention is applied will be described by referring to the drawings.

FIG. 1a is a block diagram showing a control system composed of an electric governor for the water wheel generator to which the present invention is applied. Reference numeral 1 indicates a frequency deviation detector circuit which is adapted to be applied with a system frequency $f$ and a target frequency $f_o$ at the inputs thereof and produce an output X proportional to difference $\Delta f$ between the frequencies $f$ and $f_o$. Numeral 2 denotes an element with saturation which may be provided as an integral part of the detector circuit 1 or alternatively, separately therefrom. Numeral 5 designates a amplifier having a first order lag characteristic and constituting a main portion of the electric governor. Connected to the output of the amplifier 5 is a signal converter 11 serving to convert an electric signal into a mechanical signal. Numeral 10 represents a mechanical amplifier apparatus for the mechanical signal which may be a servo motor, for example. Disposed at the output side of the mechanical amplifier 10 is a damping feedback circuit 6 composed of an incomplete differentiation circuit for producing an output in dependence on the rate of change of the mechanical or electrical output from the governor system. When the output of the damping feedback circuit 6 tends to become greater than a predetermined value, a saturation circuit 7 is operative to limit the output of circuit 6 at a constant. Numeral 9 indicates a rigidity feedback circuit adapted to produce output corresponding to the magnitude of the electrical or mechanical output from the governor system. The outputs $F_1$ and $F_2$, respectively, of the damping and the rigid feedback circuits 6 and 9 are added together at an operational or summing circuit at point 8. The output F from the summing circuit 8 and the output X from the detector circuit 1 are input to a summing circuit 3 with the polarities illustrated in the drawing. The amplifier 5 is applied with the output from the summing circuit 3. It is again to be noted that the element 4 with saturation shown as interposed between the amplifier 5 and the circuit 3 may be an equivalent to the one inherently present in the integrating circuit 5 or, alternatively, be a circuit element positively inserted. Due to the presence of the integration element 10, there is a time lag between the generation of the output X from the detector 1 and the position Y of the servo motor, as is well known in the art. For example, when the gain of the damping feedback circuit is at zero, operation is effected with a first order lag. Block 12 indicates a unit consisting of the water wheel and generator connected together for producing an output P proportional to the position of the gate servo motor. Block L represents the load on the generator, while numeral 14 denotes a summing point for the output P of the unit 12 and a load signal. Block 13 represents the inertia effect of the power generating system. In FIG. 1a, letters $K_1$, $K_2$, ... $K_6$ indicates gains of the circuits represented by associated blocks. Further, S is Laplace's operator and T is a time constant.

In the apparatus shown in FIG. 1a, assuming that the load is reduced, namely, (output P of the generator — load L)>O, the water wheel and the generator are accelerated with the output frequency thereof being correspondingly increased, whereby the detector circuit 1 detects the frequency deviation $\Delta f$ to produce a corresponding output. Then, the servo motor 10 responds to the output of the detector circuit 1 through the amplifier 5 to provide the variation in position Y. In the meantime, the damping feedback circuit 6 and the rigid feedback circuit 9 produce feedback or restoring signals $F_1$ and $F_2$, respectively, and the sum F of these signals produced at the point 8 is fed back to the operational or summing circuit 3 to act in the sense to cancel the output X from the detector circuit 1. As a result, the position Y of the gate servomotor 10 is changed to the desired value. When the difference between the power output P and the load L has become equal to zero, the whole system is then stabilized.

In the drawings, it should be understood that a larger $f$ represents a higher speed of the water wheel and the generator. Further, it should be noted that, in the graphs of saturation characteristic curves of the saturation circuits or elements depicted in the associated blocks in FIG. 1a, the abscissa and the ordinate indicate, respectively, the input and the output of the associated circuits.

Next, referring to FIG. 1b which shows a circuit diagram of an automatic control apparatus according to the invention in some detail, the detector circuit described above is generally indicated by a dotted block 1 and includes an LC-parallel resonant circuit containing a reactance L and a capcitance C connected in a bridge form with other circuit elements. More concretely, the LC-parallel resonant circuit connected at one branch, in combination with resistors $R_1$, $R_2$ and $R_3$, to form a bridge circuit having a transformer $TF_1$ connected at the output side thereof. The thus formed bridge circuit is designed so that the voltage applied to the transformer $TF_1$ becomes zero at the resonant frequency of the LC circuit. It is to be noted the resonant frequency of the LC circuit corresponds to the aforementioned command frequency $f_o$. Accordingly, if the impedance of the resonant circuit is varied in dependence upon the deviation $\Delta f$ from the command frequency, the output voltage of the bridge circuit is also varied correspondingly. The output voltage of the bridge circuit is shifted in phase by 90 degrees through a capacitance CS and thereafter applied to the transformer $TF_1$. On the other hand, the generator 35 is driven by the hydraulic turbine or water wheel 30 to supply the output power to the load L. There is provided a rotational speed detector means such as a permanent magnet generator 36 which is driven by the generator 35 to produce an output signal representative of the rotational speed of the generator, which signal is then fed to the input of the bridge circuit mentioned above. Further connected to the bridge circuit is the primary winding of another transformer $TF_2$, the secondary side of which is connected with the secondary windings of the transformer $TF_1$ in the reversed phase as is illustrated in the drawing and constitutes a synchronous rectifier circuit in combination with rectifier circuits $SF_1$ and $SF_2$. In this manner, the output voltage VF appearing across resistors $R_4$ and $R_5$ is varies linearly in dependence upon the variation in the frequency. In other words, the variations in the output voltage VF and the frequency $f$ are substantially in a proportional relationship to each other. The output voltage VF is applied to the amplifier 5 together with the outputs of the aforementioned damping feedback circuit (6, 7) and the rigid feedback circuit 9. A detailed description of the damping feedback circuit, will be made hereinafter with reference to FIGS. 2 to 4. The output signal from the circuit 5 is fed to an induction coil $L_0$ and thereby converted into a vertical displacement of a plunger P suspended at an appropriate stationary portion of the apparatus through a spring S. Connected to the plunger P through a rod 45 is a pilot valve plunger 44 which in turn is inserted into a pilot valve bushing 43. The bushing 43 is supplied with compressed oil by way of an oil supply conduit 48 whereby the pilot valve plunger 44 is caused to move vertically under the pressure of oil to selectively open or close exit ports 46 and 47. When the exit port 46 is opened, oil under pressure is fed to the chamber of a servo valve apparatus 10 at the left side of the piston 10a as viewed in FIG. 1b through conduit 20 to thereby urge the piston 10a rightwardly or in the opening direction.

In a similar manner, when the exit port 47 is opened, pressurized oil urges the piston 10a to the left or in the closing direction through a conduit 21. The displacement of the piston rod 10b is sensed by a potentiometer PM of a well known construction and the detection signal thereof is applied to the inputs of both the damping feedback circuit (6, 7) and the rigid feedback circuit 9.

Referring to FIG. 2, which shows a main portion of the apparatus according to the invention, the operation is as follows.

1. Assuming that the input value $a_1$ at which the detector circuit 1 is saturated is smaller than the input value $b_1$ at which the damping feedback circuit 6 is saturated (that is, $|a_1|<|b_1|$) and that $|a_2|<|b_2|$, the damping feedback action is operative for any value of the frequency deviation $\Delta f$ whereby the stability in operation of the governor can be attained. On the other hand, even if it becomes necessary to rapidly close the output regulator apparatus for the hydraulic turbine, (guide vanes or deflectors, for example) due to a large increase in the frequency deviation $\Delta f$, the desired closing speed of the servomotor 10 cannot be attained, since the suppressing operation will still remain active.

2. Let us assume on the contrary that the input value $a_1$ at which the output value of the detector circuit is saturated is greater than the input value $b_1$ at which the output value of the damping feedback circuit 6 is saturated (namely, $|a_1|>|b_1|$) and that $|a_2|<|b_2|$. Then, if the necessity arises to instantly close the guide vanes or the deflectors because of a large increase in the frequency deviation $\Delta f$, the desired closing speed of the servo valve 10 can now be attained to allow the rapid closing of the guide vanes or the deflectors, since the damping feedback signal $F_1$ to cancel the output X of the detector circuit 1 is restricted by the input value $b_1$ at which the damping feedback circuit 6 is saturated and hence the above frequency deviation can not completely be cancelled, which consequently renders it possible for the servomotor to be rapidly operated.

On the other hand, when the guide vanes are to be opened in response to any decrease in the frequency deviation $\Delta f$ under the condition that $|a_2|<|b_2|$, the damping feedback signal $F_1$ can attain a value to offset the output signal X within an allowed range because of the restriction imposed on the value of the output signal X. Thus, the damping feedback or restore system may exhibit the inherent stabilizing performance, as a result of which the servomotor 10 can be slowly opened.

Briefly stated, in the case of the governor for a hydraulic turbine or water wheel generator, a predetermined rapid response is necessary in the closing operation to suppress any increase in the relationship speed of the generator or variation in the network or system frequency X, while an adequate damping feedback is required in the reverse or opening direction to attain the desired stability. These conditions are satisfied by the operations described above.

3. When associated circuit parameters are so selected that $|a_1| > |b_1|$ and $|a_2| > |b_2|$ to provide the saturation of the damping feedback both in the opening and closing directions, the rapidity of response of the governor is enhanced in both directions. However, the stability of the operation is considerably deteriorated.

It will of course be appreciated that, with the saturation characteristics, given to the damping feedback circuitry, one is assured that the primary damping function will stabilize the operation of the system for small and/or slow variations in the frequency $f$ which does not play a role in bringing about the saturation. Referring to FIG. 2, the values of input $C_1$ and $C_2$ to the saturation element 4 are sufficiently large for possible or conceivable differences $|a_1|-|b_1|$ or $|a_2|-|b_2|$.

FIG. 3 shows an embodiment of the damping feedback circuit which constitutes an essential part of the invention. Reference letters P and N indicate terminals of a direct current or d.c. source for the feedback circuit connected to a slide resistor RA which is mechanically connected to the servomotor 10. The variable resistor RA has a wiper SA connected to a capacitor CD and a resistor RD constituting an incomplete differentiation circuit. The resistor RD has a center tap point connected to a resistor R of the saturation circuit 7 and the operational or summing circuit 3. The remaining terminal of the resistor R is connected in series to a diode D1 which in turn is connected to the resistor RD and the terminal N at the other side. With such circuit arrangement, the output $F_1$ of the damping feedback circuit 6 is limited by the forward voltage of the diode D1 and will never exceed the limited level. In this manner, the input value $b_1$ at which the damping feedback circuit 6 is saturated can be selected at a desired value by means of the saturation circuit 7. As alternative circuit arrangements for the saturation circuit 7, a Zener diode circuit, slicer circuit comprising an operational amplifier and so forth may be employed. In FIG. 3, reference numerals 20 and 21 indicate hydraulic conduits through which oil under pressure can transmit the mechanical displacement produced by the converter 11 to the servomotor 10 to correspondingly drive the latter.

FIG. 4 shows a modification of the damping feedback circuit 7 in which diodes D1 and D2 are employed for operation in the opening direction and the closing direction, respectively, to provide respective saturation characteristics $b_1$ and $b_2$. Furthermore, a diode DX is disposed also for the output of the detector circuit 1 to obtain the relation that $|a_2|<|b_2|$. In this circuit arrangement, the saturation of the damping feedback system can be made to be caused only by the input value $b_1$ by adjusting the resistor RX appropriately.

In the foregoing, exemplary embodiments of the invention applied to the electric governor have been described. However, it goes without saying that the application of the invention is not restricted to the electric governor. The present invention can be applied to all the automatic control apparatus that are provided with feedback mechanisms in the control circuit.

Figure 5:
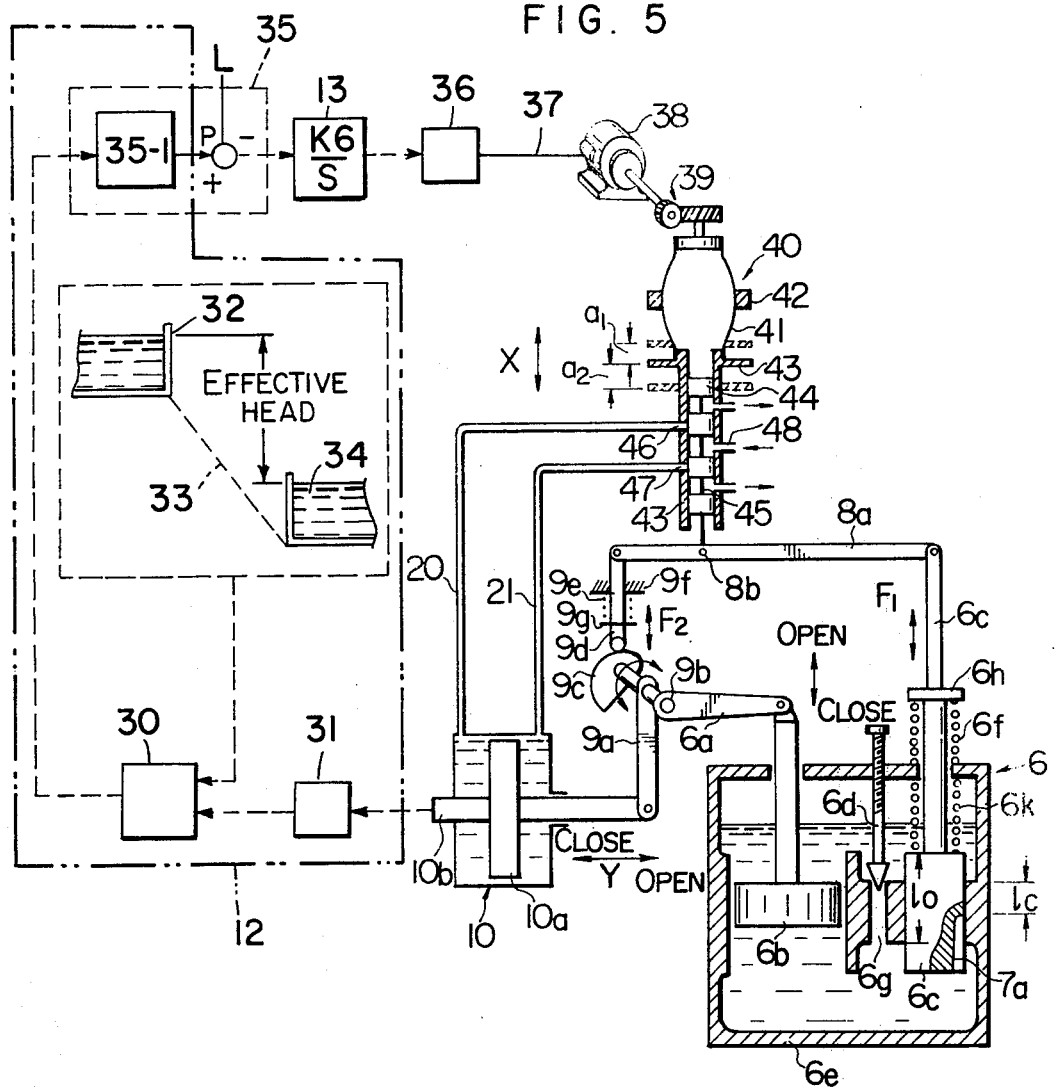
FIG. 5 shows schematically another embodiment of the automatic control apparatus of the invention applied to a mechanical governor.

FIG. 5 shows an example wherein the invention is applied to a mechanical governor for a hydraulic turbine or water wheel generator. The damping feedback system is composed of elements 6a to 6k, while the rigid feedback system consists of a linkage mechanism comprising elements indicated by reference letters 9a to 9g. Accordingly, the latter feedback system is referred to also as a linkage feedback system or means.

In case of the damping feedback system, an input piston 6b and an output piston 6c accommodated within respective cylinders are disposed in a container 6e filled with a hydraulic liquid. Positioned between the liquid mass (lower portion as viewed in the drawing) which is pressurized by the pistons and the non-pressurized liquid mass (upper portion) is a liquid passage 6g, the opening of which is adjustable by means of a needle 6d. This adjustment in turn allows the adjustment of the time constant of the damping feedback system. Spring 6f disposed between the outer wall of the container 6e and a collar 6h fixed to the piston rod as well as a spring 6k disposed between the inner wall of the container 6e and the output piston 6c urge the piston 6c to a neutral position.

Turning the description to the linkage feedback system, there is provided a rotatable shaft 9b on which a cam 9c and levers 9a and 6a are mounted. A cam follower 9d is urged to constantly bear against the cam 9c under the biasing influence of a spiral spring 9e disposed between a spring seat 9g secured to the cam follower 9d and a spring seat 9g fixed to a stationary portion of the structures. The cam follower 9d is pivotally connected to the aforementioned output piston 6c through a link 8a.

Numeral 10 indicates a servomotor which comprises a cylinder filled with a hydraulic liquid such as oil and a piston 10a disposed in the cylinder with the piston rod 10b being coupled to an output control apparatus for the water wheel 30 such as a valve mechanism 31, whereby water flow supplied to the water wheel 30 can be controlled by the movement of the piston 10a. Water stored in an upstream dam 32 is fed to the water turbine 30 by way of the control apparatus 31 through a pipe 33 and thereafter flows to a downstream dam 34. Power output from the generator 35 coupled to the water turbine and driven thereby is supplied to the load L. The rotational speed of the generator is detected by a tachometer generator such as a permanent magnet generator 36 coupled to the generator 35 and is transmitted to a speeder driving motor 38 through lines 37. The rotation of the motor 38 is transmitted to a centrifugal governor apparatus indicated generally by numeral 40 through a helical gear 39.

The centrifugal governor apparatus 40 is essentially composed of a speeder spring 41, speeder weights 42 and a pilot valve bushing 43, all of which are rotated as one unit by the driving motor 38, and a non-rotatable plunger 44 slideably inserted into the bushing 43. When the speeder spring 41 is rotated, the speeder weights 42 are moved radially outwardly under the centrifugal force, whereby the bushing 43 is displaced upwardly, the displacements of which are indicated by $a_1$ and $a_2$ in FIG. 5. Since the plunger 44 is connected to the aforementioned link 8a at a pivotal point 8b through the plunger rod 45, the relative position between the plunger 44 and the bushing 43 in which the plunger is inserted is varied, when the bushing is displaced upwardly as a result of which oil exit ports 46 and 47 are selectively opened or closed in dependence upon the variation of the relative position. The interior of the bushing 43 is supplied with pressurized oil through a hydraulic conduit 48. Accordingly, upon opening of the exit port 46, the servo valve is supplied with oil under pressure at the chamber of the opening side or at the left side of the piston 10a as viewed in the drawing to drive the piston 10a to the right, that is, in the direction to allow the output control or regulation apparatus for the turbine such as gate servomotor to be opened. On the other hand, when the exit port 47 is opened in a similar manner, the pressure of oil fed through the conduit 21 acts on the right side of the piston 10a to drive the latter in the direction of closing the gate servomotor, namely in the direction to restrict the water supply to the water wheel or turbine.

At this point, it is important to note that the displacements $a_1$ and $a_2$ of the bushing 43 from the neutral position in the upward and the downward directions indicated in FIG. 5 correspond to the input values $a_1$ and $a_2$ in the saturation circuit 2 for the detector circuit 1 described in conjunction with FIG. 2. Further, the saturating input values $b_1$ and $b_2$ in the saturation circuit 7 for the damping feedback circuit shown in FIG. 2 correspond to the displacements $l_c$ and $l_o$ of the output piston 6c from the neutral position of the damping feedback mechanism 6 such as a dash pot, as is illustrated in FIG. 5. In more detail, when the output piston 6c is moved upwardly for a distance $l_c$ from the illustrated neutral position, a notch 7a formed in the piston 6c becomes in the position to serve for a passage through which oil can escape without exerting pressure to the piston 6c. Then, the piston 6c can not be moved any further. The point attained by the output piston 6c after the upward movement for $l_c$ is thus the saturated point of the output of the piston 6c. In a similar manner, the output displacement of the piston 6c becomes saturated, when the piston 6c has been moved by a distance $l_o$ in the downward direction (or in the opening direction).

When the piston 10a of the servomotor 10 is moved in the closing or throttling direction, the spindle or shaft 9b is rotated clockwise and the input piston 6b is lowered by means of the lever 6a, which results in the upward movement of the output piston 6c with time constant determined by the needle 6d. On the other side, in the linkage feedback mechanism 9, the cam follower 9d is moved upwardly. These upward movements both of the output piston 6c and the cam follower 9d are added together at the link 8a and the resulted sum will appear at the pivotal shaft 8b to be supplied to the centrifugal governor apparatus 40 in the form of the upward movement of the plunger rod 45. As a result, the exit port 47 is reclosed and the closing motion of the piston 10a is stopped at a desired position. Accordingly, when case the relation $|a_1| > |l_c|$ is established among the saturating input values $a_1$, $a_2$, $l_c$ and $l_o$, the response speed of the mechanical governor can be improved in the closing operation of the servomotor 10, while, in the condition $|a_1| < |l_o|$, an enhanced stability of the governor mechanism can be obtained in the opening operation of the servometer 10 for the control apparatus 31.

In the arrangement of the apparatus shown in FIG. 5, the saturating input values $a_1$, $a_2$, and $l_o$ are selected sufficiently large for possible variations in the frequency $f$ of the generator so that the corresponding outputs may not be saturated, while the quantity $l_c$ is of a relatively small value, whereby the response rapidity is increased in the closing control operation of the mechanical governor.

Figure 6:
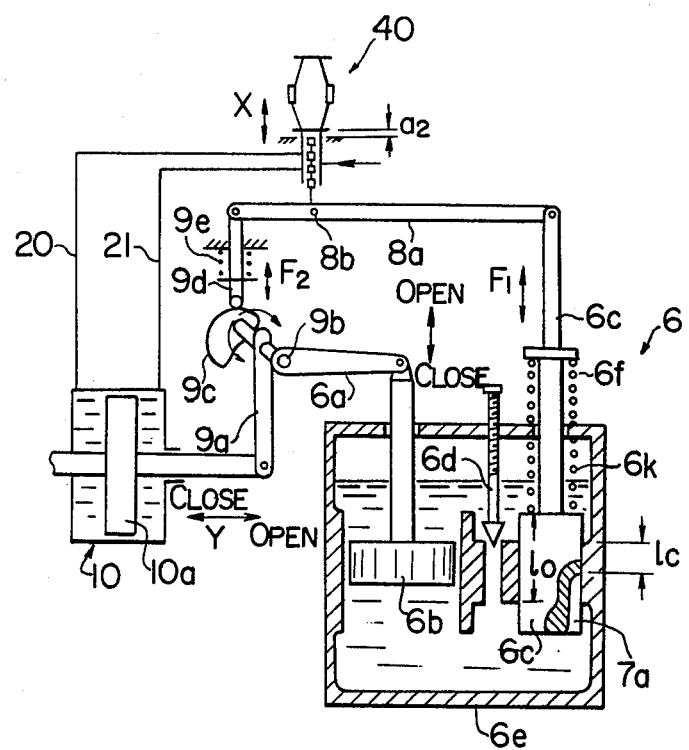
FIG. 6 is a view similar to FIG. 5 and shows a modification of the construction shown in FIG. 5.

FIG. 6 shows another arrangement in which the quantities $a_1$ and $l_o$ are selected at sufficiently large values for possible variations in the frequency $f$ of the generator with the input value $a_2$ being relatively small so that the conditions that $|a_2| < |l_o|$ and $|a_1| > |l_c|$ may be satisfied. With this arrangement, the rapidity of response in the closing operation of the servomotor 10 and the stability in case of the opening control are both improved in the regulating operation of the mechanical governor.

I claim:

1. Automatic control apparatus provided with element having saturation characteristics, comprising a detector means for detecting deviation of an actual value from a target value, an amplifier means for receiving the output signal from said detector means at the input thereof to amplify said signal with integration to thereby produce a corresponding output signal, a feedback means for feeding back said output signal from said amplifier means through a damping feedback element and a rigid feedback element, a summing means for deriving the difference between the output signal of said detector means and said feedback means to feed the difference signal to said amplifier means, a control means to regulate a unit to be controlled in dependence upon said output signal of said amplifier means, and means for saturating the output signal of said damping feedback means only for the operation of said unit in either the opening or closing direction.

2. Automatic control apparatus with element having saturation characteristics according to claim 1, further comprising means for saturating the output signal of said damping feedback means only for the operation of said unit to be controlled in the closing direction.

3. Automatic control apparatus provided with element having saturation characteristics according to claim 1, wherein the output signal of said damping feedback means is adapted to be saturated both for the opening and the closing operations of said unit to be controlled, further comprising means for saturating the output signal of said detector means for the operation of said unit to be controlled either in the opening or closing direction, the value at which said output signal is saturated being selected to be smaller than a given value at which the output signal of said damping feedback means is saturated for the operation of said unit in the corresponding direction.

4. Automatic control apparatus according to claim 1, wherein the output signal of said damping feedback means is adapted to be saturated both for the opening and the closing operations of said unit to be controlled, further comprising means for saturating the output signal of said detector means for the operation of said unit to be controlled in the opening direction, the value at which said output signal is saturated being selected to be smaller than a given value at which the output signal of said damping feedback means is saturated for the operation of said unit in the opening direction.

5. Automatic control apparatus according to claim 1, wherein all of said detector means, amplifier means, feedback means, summing means and saturating means are composed of electrical means and said control means comprises a signal converter for converting the electric output signal of said amplifier means into a corresponding mechanical output signal.

6. Automatic control apparatus according to claim 1, wherein all of said detector means, amplifier means, feedback means, summing means, control means and saturating means are composed of mechanical means.

* * * * *